Feb. 10, 1970 W. A. MOREY 3,494,488
OVERHEAD CRANE AND ARTICLE HANDLING STORAGE SYSTEM
Original Filed July 31, 1967 5 Sheets-Sheet 3
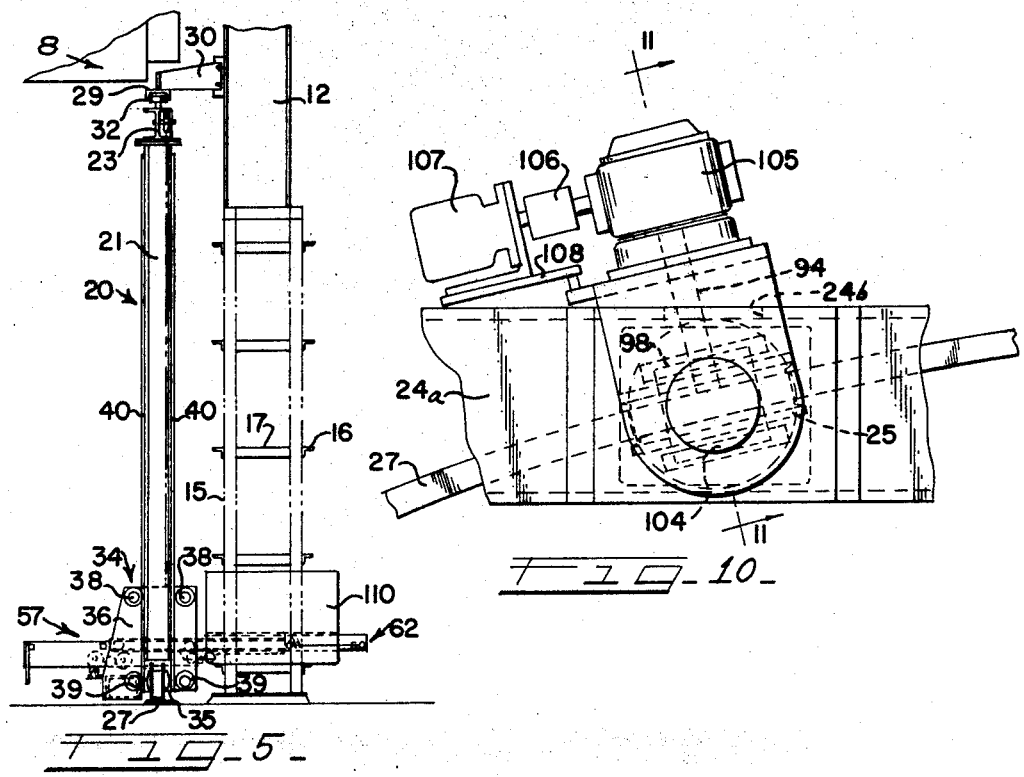
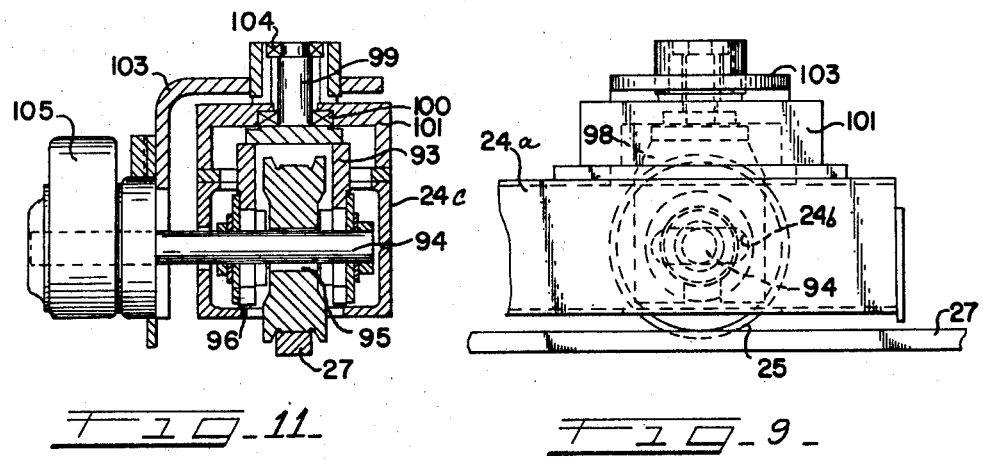
INVENTOR
WOODRUFF A. MOREY
BY
ATT'YS.

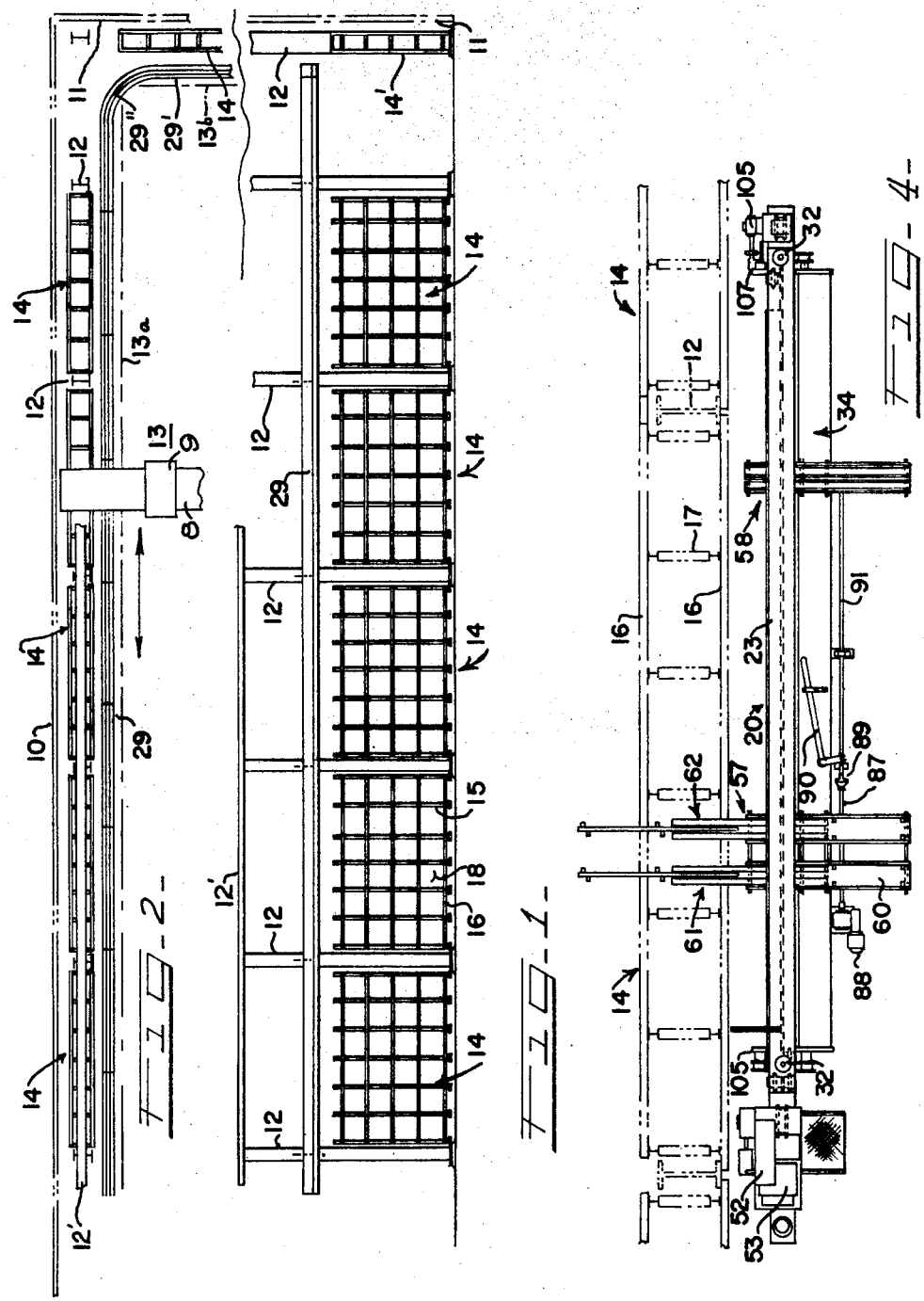

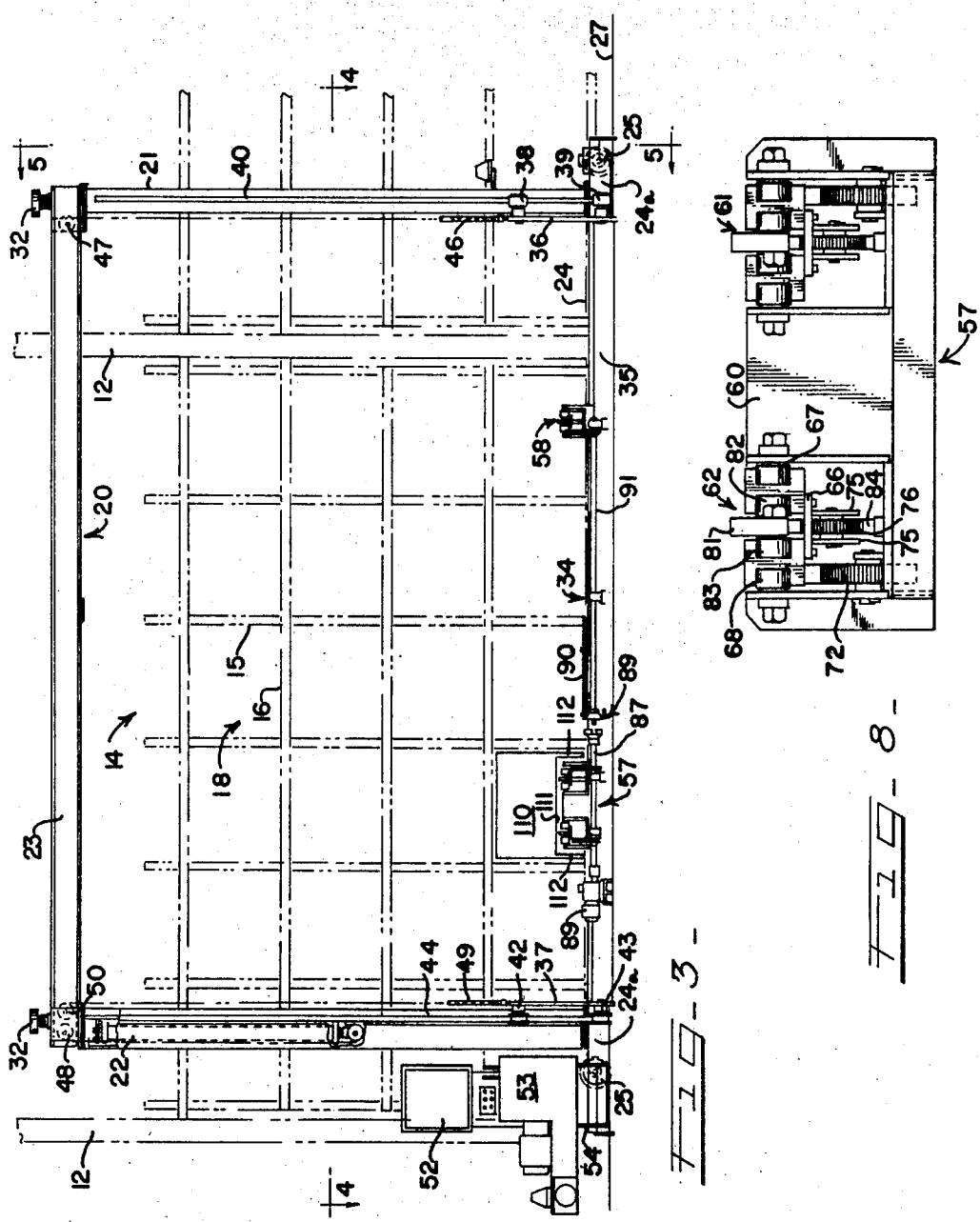

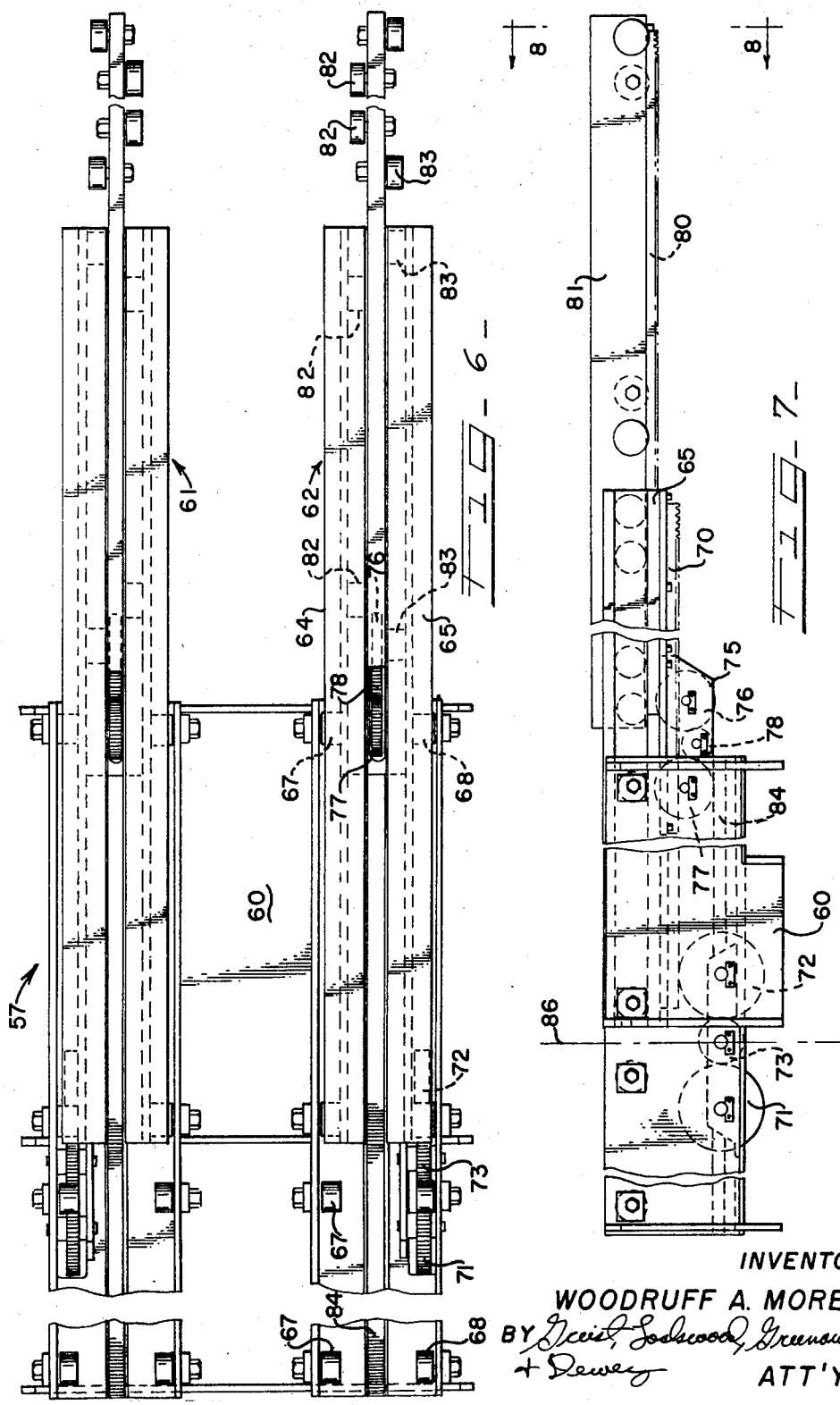

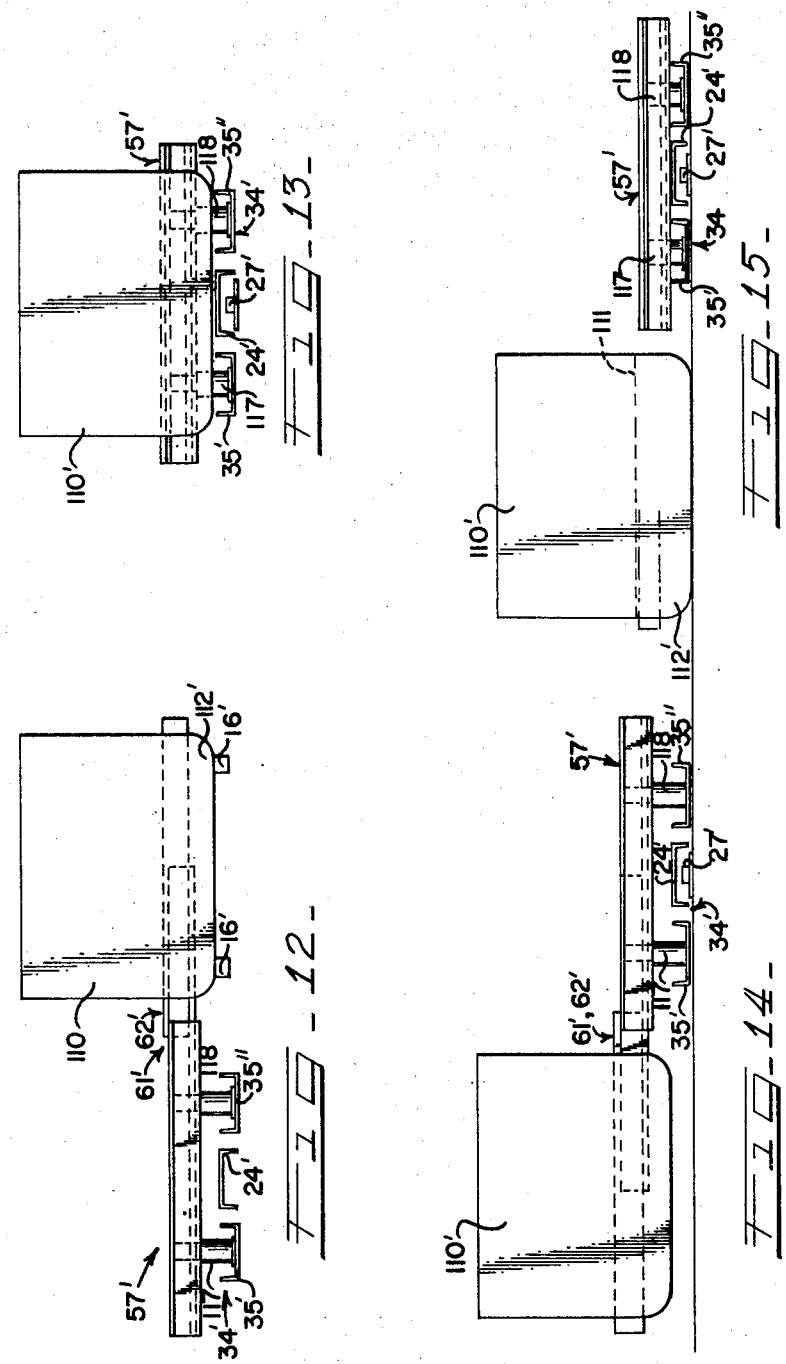

United States Patent Office 3,494,488
Patented Feb. 10, 1970

1

3,494,488
OVERHEAD CRANE AND ARTICLE HANDLING STORAGE SYSTEM
Woodruff A. Morey, Flossmoor, Ill., assignor to Whiting Corporation, a corporation of Illinois
Continuation of application Ser. No. 661,749, July 31, 1967. This application Aug. 28, 1968, Ser. No. 756,068
Int. Cl. E04h 6/00
U.S. Cl. 214—16.4                     6 Claims

ABSTRACT OF THE DISCLOSURE

The columns supporting one rail of an overhead crane in an industrial building define an elongated area adjacent one side wall of the building which is inaccessible to the crane itself. A series of storage racks are mounted in this area along and adjacent such side wall of the building and define a plurality of horizontally and vertically spaced storage areas which are accessible from the inside of the building. A material handling mechanism includes a vertically disposed frame having upper and lower sets of rollers engaging rails for movement of the frame in a vertical plane parallel with said building sdewall and contiguous with said storage racks such that the latter are disposed between such plane and the building sidewall. The frame mounts a carriage for vertical reciprocal movement relative thereto. The carriage mounts first and second extensible forks for reciprocal movement along horizontal paths perpendicular to said vertical plane for transferring articles back and forth between the carriage and any of said storage areas. The carriage includes power means engaged with the extensible members for moving the latter vertically relative to the carriage thereby to permit handling of an article from and to a floor position. The rollers on the frame are mounted for pivoting movement about vertical axes thereby adapting the frame to follow curved rails for servicing storage racks mounted adjacent two or more of the building walls.

OBJECTS OF THE INVENTION

This application is a continuation of my application Ser. No. 661,749, filed July 31, 1967, now abandoned.

The present invention relates to a material handling system, and more particularly to a new and improved system specially adapted for use in an industrial building in which an overhead crane is installed.

A primary object of the present invention is the provision of a new and improved material handling system including storage racks mounted adjacent one of the walls of a building in which an overhead crane is installed, and a special material handling mechanism for storing articles in such racks and for retrieving articles therefrom.

Another object of the present invention is the provision of a material handling system of the type described in which the material handling mechanism includes a common horizontal plane for handling elongated objects, such as rods and pipes.

Still another object of the present invention is the provision of a material handling system of the type described in which the material handling mechanism includes a frame with rollers pivoted about vertical axes thereby adapting the mechanism to follow curved rails for servicing racks mounted adjacent two or more of the building walls.

2

Another object of the present invention is the provision of a material handling system of the type described in which the mechanism includes a carriage having horizontally extensible forks, the latter being mounted by power means for vertical reciprocal movement relative to the carriage thereby to permit handling of an article from and to a floor position.

These and other objects and advantages of the invention will become apparent from the following specification disclosing a preferred embodiment illustrated in the accompanying drawings.

DESCRIPTION OF THE DRAWINGS

FIG. 1 is a side elevational view as seen looking from the inside toward one sidewall of an industrial building in which an overhead crane is installed and primarily showing the sets of storage racks mounted adjacent said one sidewall;

FIG. 2 is a top plan view of the arrangement shown in FIG. 1;

FIG. 3 is an enlarged side elevation similar to FIG. 1 showing the storage racks in phantom lines and primarily illustrating the material handling mechanism;

FIG. 4 is a section taken along the line 4—4 of FIG. 3;

FIG. 5 is a section taken along the line 5—5 of FIG. 3;

FIG. 6 is an enlarged top plan view of one of the sets of extensible forks;

FIG. 7 is a side elevational view of the extensible forks shown in FIG. 6;

FIG. 8 is an end view taken along the line 8—8 of FIG. 7;

FIG. 9 is an enlarged, fragmentary elevational view showing the arrangement for mounting one of the lower rollers of the frame of the material handling mechanism;

FIG. 10 is a top plan view of the arrangement shown in FIG. 9;

FIG. 11 is a section taken along the line 11—11 of FIG. 10; and

FIGS. 12 through 15 are side elevations, largely diagrammatic, showing the various phases of operation of a modified carriage of the material handling mechanism, said carriage permitting handling of an article from and to a floor position.

DESCRIPTION OF A PREFERRED EMBODIMENT

Referring to FIGS. 1 and 2, one side wall and one end wall of an industrial building are shown in phantom lines and are designated 10 and 11, respectively. It will be understood this building mounts an overhead crane beam 8 for movement in the direction of the arrows shown in FIG. 2. The crane includes the usual carriage or trolley 9 for movement laterally of the direction of movement of the crane 8. One end of the crane beam is supported by a rail (not shown) which is mounted on a runway beam 12' supported by a plurality of columns 12 spaced at intervals along the side wall 10. It will be understood the other end of the crane beam is supported on a rail mounted on a runway beam supported by columns at the same spacing as the columns 12, such other columns (not shown) being mounted adjacent the other side wall of the building or intermediate the side walls of the building depending on whether the latter has one or more bays for housing overhead cranes or other equipment.

The carriage 9 has depending therefrom the usual cables supporting a lifting hook (not shown), all conventional and well known to those skilled in the art. The limit of movement of the carriage 9 laterally of the crane beam 8 is such that the lifting hook cannot be moved into the areas between the columns 12 and adjacent the building wall. In other words, it will be appreciated that the areas between the columns 12 and adjacent the sidewall 10 are inaccessible to the overhead crane. Another area inaccessible to the crane is located at the end of the building extending along the end wall 11. This inaccessible area results from the fact that the crane itself cannot be run longitudinally to an extent where the lifting hook can be lowered into this area adjacent the end wall 11. It will be understood that similar areas inaccessible to the crane may very well exist at the other end of the building and between the columns supporting the rail which in turn supports the other end of the overhead crane. Actually, the crane services a rectangular area 13 having one side boundary 13a and one end boundary 13b parallel respectively with walls 10 and 11. Heretofore, these various areas inaccessible to the crane have not been utilized to any great extent. The present invention has to do with a unique material handling system which makes advantageous use of these inaccessible areas thereby minimizing the amount of wasted space within an industrial building in which an overhead crane is installed. Further, the present invention serves, at least in some installations, as a convenient means for storing and retrieving component parts in an assembly process which utilizes the overhead crane.

The material handling system according to the present invention includes sets of storage racks, generally designated 14, erected between the columns 12 adjacent the sidewall 10. Each storage rack assembly includes a plurality of vertical stringers 15 and horizontal stringers 16, 17, secured together by suitable means, such as welding, thereby defining a plurality of vertically and horizontally spaced storage areas 18, which areas are accessible from the inside of the building. A number of identical storage racks 14' are preferably mounted along the end wall 11 in those areas inaccessible to the overhead crane. It will be understood that similar or identical storage rack assemblies may be provided along the opposite building end wall and between the other set of columns which support the overhead crane, depending on individual requirements. The racks can be secured to the columns for bracing both the former and the latter.

Referring particularly to FIGS. 3 through 5, the material handling mechanism for servicing the sets of storage racks 14 will be seen to include an open, generally rectangular frame 20 disposed in a vertical plane and including end posts or columns 21 and 22, an upper cross member 23, and a lower cross member 24. The frame 20 is preferably formed by standard structural steel members rigidly secured together as by welding or by bolted connections. Lower cross member 24 has extensions 24a at opposite ends thereof mounting rollers 25 in a manner to be more fully described hereinbelow.

The rollers 25 are engaged with a rail 27, the latter being suitable supported from the floor of the building in front of the sets of storage racks 14, in parallel relation with the building walls, and contiguous with boundary lines 13a and 13b. An upper rail in the form of an inverted channel 29 (FIG. 5) is supported from cantilevered members 30, these members being supported from respective columns 12. Upper cross member 23 of the frame includes two pairs of rollers 32 at respective opposite ends thereof, which rollers engage the flanges of the channel rail 29 to hold the frame in a vertical plane and to cause the same to follow the rail 29. The rail 29 is mounted directly over the rail 27; rail 29 is illustrated in plan view in FIG. 2 and will be seen to join a rail portion 29', the latter extending along the racks 14' in parallel relation with the building end wall 11. The rail 29 joins the rail portion 29' at a section 29" which is bent at a horizontal radius. It will be understood of course the rail 27 follows the same pattern as rail 29. The rails 27, 29 define respective lower and upper guides for guiding the frame 20 horizontally in vertical planes parallel with the building walls 10, 11 and contiguous with the boundary lines 13a, 13b.

Frame 20 mounts a carriage 34 for vertical movement relative thereto. This carriage consists of a cross beam 35 having opposite ends thereof secured to dolley assemblies 36 and 37. The dolley 36, best seen in FIG. 5, includes upper and lower pairs of rollers 38 and 39, respectively, which engage rail bars 40 secured to opposite faces of the frame post member 21. In like manner, dolley 37 includes upper and lower pairs of rollers 42, 43 engaged with rail bars 44 secured to opposite faces of the frame post 22.

A chain 46 has one end thereof secured to the dolley 36, this chain being trained over wheels 47 and 48 pivotally mounted at respective opposite ends of the cross member 23. Another chain 49 is secured to the dolley 37; this chain is trained around a wheel 50 mounted by the cross member 23 adjacent the wheel 48. It will be understood the other ends of the chains 46, 49 extend downwardly adjacent the end post 22 and are connected to suitable power equipment, the latter being controlled from a console 52 and operating control box 53, both mounted on a platform 54 supported from one of the extensions 24a of the lower cross frame member. Manifestly, this arrangement provides for raising and lowering the carriage 34 relative to the frame 20.

The carriage includes first and second extensible fork assemblies 57 and 58, respectively, which are spaced apart longitudinally of the carriage for movement relative thereto in a horizontal plane and transversely of the carriage beam 35. The extensible fork assembly 57 is best illustrated in FIGS. 6 through 8.

This assembly includes a frame 60 suitably secured to the beam 35 of the carriage. The frame 60 mounts first and second extensible forks 61 and 62, respectively, which forks are of identical construction; therefore, only one fork, namely fork 62, will be described in detail.

The extensible fork 62 includes an intermediate fork consisting of a pair of I-beams 64, 65 secured together by one or more bracket plates 66 (FIG. 8). The frame 60 mounts a first set of rollers 67 adapted to be received within the outer flanges of the beam 64 and a second set of rollers 68 adapted to be received within the outer flanges of the beam 65 thereby to mount these two beams for horizontal reciprocal movement relative to the frame 60. Beam 65 carries a rack 70 arranged for meshing engagement with gears 71, 72 such gears meshing with a drive gear 73.

Beams 64, 65 mount a pair of depending bracket plates 75 which in turn mount a pair of gears 76, 77, these gears meshing with an idler gear 78 also carried by the bracket plates. The gears 76, 77 are adapted to mesh with teeth on a rack 80, the latter being secured to the underside of a primary fork 81. This primary fork carries sets of rollers 82, 83 on opposite sides thereof for respective rolling engagement within the innermost flanges of the beams 64, 65.

Gears 76, 77 also mesh with a rack 84 fixed to the frame 60. It should be apparent that upon rotation of the gears 71, 72 for extending the beams 64, 65 relative to the frame 70, the primary fork 81 will be extended relative to the beams 64, 65 by reason of the engagement between the gears 76, 77 and the racks 80 and 84. The forks 61, 62 are shown fully extended to one side of a vertical plane designated 86, such plane containing the central axis of a drive shaft 87 (FIG. 4) which drives the gear 73. It will be understod that the forks 61, 62 can be extended to the same distance to the other side of the plane 86 by reversing the direction of rotation of the drive gear 73 in which case only gears 71, 76 and 77 will be in engagement with respective racks 70, 84 and 80 during final movement of the forks. As it will be apparent from FIG. 5, when the forks are extended to the other side of the carriage 34, they can be loaded and unloaded by the overhead crane.

The second fork assembly 58 is not shown in detail. Essentially it is a duplicate of one of the extensible forks 61 or 62 of the fork assembly 57.

Referring now to FIG. 4, the carriage 34 mounts a motor assembly 88 connected with one end of the drive shaft 87, the other end thereof being connected to a clutch assembly 89, the latter being manually operated from a lever 90. When the clutch is engaged, the shaft 87 drives another shaft 91, the latter serving to extend the fork assembly 58. It will be appreciated that the fork assembly 58 can be placed into operation to be extended simultaneously with the fork assembly 57 when desired.

Turning to FIGS. 9 through 11, the mounting for the frame rollers 25 will now be described, it being understood that the mounting for each roller 25 is the same. Roller 25 is mounted on a driven shaft 94 for rotation therewith, as by means of a key 95. The shaft 94 is journaled in bearings 96, the latter being mounted in the side members of an inverted U-shaped bracket member 98. This member contains an upwardly extending pin 99 journaled in a bearing assembly 100, the latter being mounted in appropriate framework 101 secured to the beam extension 24a. It will be appreciated that bracket 98 mounts the roller 25 for pivoting movement about a vertical axis defined by the longitudinal central axis of the pin 99. A slot 24b in the member 24 accommodates swinging movement of the shaft 94.

A right angle bracket plate 103 has one leg thereof provided with an assembly including a bearing 104 engaged with the pin 99. The other leg of this bracket plate aids in supporting a gear box 105, the latter being mounted on the shaft 94. Extending from the gear box 105 is another shaft 106 which is driven from an electric motor 107, such motor being mounted from a plate 108 connected to the depending leg of the bracket plate 103. It will be understood that operation of motor 107 drives roller 25. The motors 107 associated with the rollers 25 are controlled from suitable means at the operating console and operating control boxes 52 and 53. By reason of the pivoting of the rollers 25 about vertical axes, and by reason of the engagement of the upper rollers 32 with the upper rail, the frame 20 is adapted to traverse curved track, thereby permitting one material handling mechanism to service storage racks located adjacent more than one of the building walls. Of course, if in a particular installation the frame 20 is to traverse only straight track, the rollers would be mounted on fixed axles.

Operation of the motor 107 causes movement of the frame 20 for positioning the latter at any desired location, such as adjacent one of the sets of storage racks 14. The carriage 34 is raised for positioning the extensible fork assemblies at the proper elevation. The fork assembly 57 is then extended into one of the storage areas 18 for storing or retrieving an article, as the case may be. Since the fork assembly 57 can be extended to either side of the frame 20, the assembly can be readily loaded or unloaded. Normally, the secondary fork assembly 58 is only used when elongated articles, such as rods or pipes, are to be handled, such articles being stored on or retrieved from the tops of the storage racks 14.

The embodiment of the material handling system shown for purposes of illustration is adapted for handling individual articles 110 in the form of so-called tote boxes as seen in FIGS. 3 and 5. The tote box is of generally box-like form, open at the top, including a base or bottom 111, and side runners or legs 112 which define a space between the base 111 and the floor or the horizontal stringers 16, as the case may be. This space opens at opposite ends of the tote box and permits entry or exit of the forks 61, 62 of the fork assembly 57, it being understood that the upper horizontal surfaces of the primary forks 81 engage the underside of the base for supporting the tote box.

It will be further understood that extensible fork assembly 57 is capable of shifting a tote box 110 from one side of the carriage 34 to the other side thereof by retracting forks 61, 62 from the positions illustrated and extending such forks in the other direction. The primary forks 81 support the tote box at such an elevation relative to the carriage that the bottoms of the legs 112 of the tote box clear the frame 60 to permit this movement of the tote box from one side to the other of the carriage.

By referring to FIG. 5, it will be observed that the extensible fork assembly 57 cannot pick up a tote box 110 resting on the building floor or deposit a tote box on such floor. This is because the carriage 34 and extensible fork assembly 57 cannot be lowered to an extent which would permit the forks 61, 62 to extend under the base 111 of the tote box resting on the floor. Merely mounting the forks 61, 62 at a lower elevation relative to the frame 60 of the extensible fork assembly would not permit handling of a tote box to and from a floor position, as in such an arrangement the legs 112 of the tote box would strike the frame 60 during retraction of the forks 61, 62 in attempting to shift the tote box hoizontally. A modified carriage arrangement which permits handling a tote box 110 to and from a floor position is illustrated in FIGS. 12 through 15.

In these four figures, the parts which correspond to the parts of the FIGS. 1 through 11 embodiment are indicated by the prime form of numeral. The vertical frame including lower cross member 24' mounts a carriage 34' for vertical movement. Such carriage includes channel beams 35', 35" having their opposite ends mounted to dolleys (not shown) similar to dolleys 36 and 37. These channels each mount a pair of hydraulic jacks 117, 118, which jacks in turn mount a pair of extensible forks 61', 62'. It will be understood these forks may be of identical construction with the forks 61, 62 described above. Actuation of the jacks 117, 118 serves to move the forks 61', 62' vertically relative to the carriage 34' between the uppermost position illustrated in FIG. 12 and the lowermost position illustrated in FIG. 15. The operation of this modified form is as follows:

Looking to FIG. 12, the carriage has been lowered to position the forks 61', 62' in supporting engagement with the base 111' of a tote box 110' (resting on supports 16') with jacks 117, 118 in their extended position. As the forks 61', 62' are elevated relative to the carriage 34', the tote box 110' can be readily shifted or transferred from one side to the other of the carriage as the legs 112' of the tote box will clear the two channels 35', 35". FIG. 13 illustrates the tote box 110' positioned directly over the carriage.

In FIG. 14, the carriage has been lowered to its lowermost position such that the beams 35', 35" are disposed just over the building floor. The forks 61', 62' are extended in the other direction thereby to position the tote box 110' to the other side of the carriage. Next, the jacks 117, 118 are lowered until the legs 112' of the tote box come into contact with the floor. The extensible forks 61', 62' are now lowered slightly so as to clear the base 111' and then retracted over the carriage to the position illustrated in FIG. 15.

Referring back to FIG. 14, it will be apparent the forks 61', 62' can be retracted and extended in the other direction for shifting the tote box 110' horizontally to position the same on the other side of the carriage. As mentioned above, extension of the jacks 117, 118 results in lifting the tote box 110' relative to the carriage 34' such that the legs 112' clear the carriage members, i.e., channels 35', 35".

Thus, the present invention makes advantageous use of those areas in an industrial building housing an overhead crane, which areas have heretofore merely constituted wasted space. In some crane installations, the material handling system of this invention serves as a convenient means for storing and retrieving component parts for an assembly process carried out by the overhead crane. It is important to understand the material handling system does not in any way interfere with operation of the overhead crane. In this respect, it will be noted the channel rail 29 and the supports 30 therefor are cleared by the overhead crane 8 (fragmentarily shown in FIG. 5) which passes over such rail and supports.

The material handling mechanism of the present invention has many advantages over known material handling mechanisms, such as a fork-lift truck. A fork-lift truck would require an open area or aisle of considerable width along and in front of the racks 14, as it is necessary for a fork lift to turn through 90° to place the forks thereof into position for handling articles to and from the storage spaces. By way of contrast, it will be noted from FIG. 5 that the material handling mechanism of the present invention operates in an aisle of relatively narrow width. A fork-lift truck also has the disadvantage of limited height capability. It will be apparent the material handling mechanism of this invention can service storage areas or spaces at a considerble height. Another advantage of the material handling mechanism of this invention is its ready adaptability for being automated which is not the case with a fork-lift truck.

I claim:

1. The combination of:
   (a) a building having at least one vertical wall;
   (b) an overhead crane mounted in said building, support means spaced from and parallel to said wall, runway means mounted on said support means for guiding said crane in either direction along a path parallel with said wall for servicing a rectangular area within said building wih one side boundary thereof being in parallel spaced relation from said wall thereby defining therebetween an elongated area which is inaccessible to the crane;
   (c) a series of storage racks mounted in said elongated area along and adjacent said wall and defining a plurality of vertically and horizontally spaced storage areas which are accessible from said rectangular area;
   (d) a material handling mechanism including:
      (1) a frame extending the height of said racks and guide means for guiding the frame horizontally in a vertical plane contiguous with said side boundary, said guide means including upper guide means adjacent the upper end of the frame, and means fixedly mounting said upper guide means;
      (2) a carriage mounted on said frame for vertical reciprocal movement relative thereto;
      (3) extensible means mounted on said carriage for hoziontal reciprocal movement relative thereto, the movement of said extensible means being along a rectilinear path perpendicular to said vertical plane;
   (e) said mechanism serving to store articles in any of said storage areas and to retrieve such articles therefrom.

2. The combination according to claim 1 further defined by: rail means engaged with the upper end of said frame for supporting the latter, said rail means and said frame being arranged to provide clearance between the same and said crane such that said material handling mechanism does not interfere with operation of the crane.

3. The combination according to claim 1 further defined by:
   (a) first and second of said extensible means mounted on said carriage;
   (b) said first and second extensible means being in a common horizontal plane and spaced apart along the direction of movement of said frame;
   (c) said first and second extensible means adapting said mechanism to handle elongated articles, such as rods or pipes.

4. The combination according to claim 1 wherein each of the articles to be handled consists of a base supported on a plurality of legs defining a space beneath the base for entry and exit of said extensible means, said mechanism being further defined by:
   (a) power means mounting said extensible means also for vertical reciprocal movement relative to said carriage;
   (b) said extensible means being vertically dimensioned such that it is adapted to extend under the base of an article on the floor of said building when said carriage is in its lowermost position;
   (c) said power means being adapted to raise said extensible means relative to said carriage such that said article is lifted for clearance of the legs thereof with the carriage upon horizontal transfer of said article by said extensible means;
   (d) whereby said mechanism is adapted to move articles back and forth between any of said storage areas and a location on the floor of said building.

5. The combination of:
   (a) a building having at least a sidewall and an end wall;
   (b) an overhead crane mounted in said building, support means spaced from and parallel to said sidewall, runway means mounted on said support means for guiding said crane along a path parallel with said sidewall for servicing a rectangular area within said building the boundary lines of which are spaced from the building walls thereby defining a first elongated area between said sidewall and the adjacent one of said boundary lines and a second elongated area between said end wall and the adjacent one of said boundary lines, which first and second elongated areas are inaccessible to the crane;
   (c) a series of storage racks mounted in said first and second elongated areas along and adjacent said sidewall and said end wall and defining a plurality of vertically and horizontally spaced storage areas which are accessible from said rectangular area;
   (d) rail means supported in said building and being contained in two vertical planes at a generally right angle with each other and contiguous with both of said boundary lines, respectively, said rail means being curved at a horizontal radius as it passes from one to the other of said planes;
   (e) a material handling mechanism including:
      (1) a frame extending the height of said racks and having roller means engaged with said rail means for supporting the frame from said rail means, said roller means being rotatable about vertical axes thereby to adapt the frame for movement back and forth between said two vertical planes;
      (2) a carriage mounted on said frame for vertical reciprocal movement relative thereto;
      (3) extensible means mounted on said carriage for horizontal reciprocal movement relative thereto, the movement of said extensible means being along a rectilinear path perpendicular to a vertical plane containing said frame;
   (f) said mechanism serving to store articles in any of said storage areas and to retrieve such articles therefrom.

6. The combination according to claim 5 further defined by: said rail means include upper rails supported above the building floor at a height generally the same as the height of said frame, said rails including a side rail in parallel spaced relation with said side wall of the building, said side rail and said frame being arranged to provide clearance between the same and said crane such that said side rail and said frame do not interfere with operation of the crane.

References Cited

UNITED STATES PATENTS

| 1,369,393 | 2/1921 | Burgees. | |
| 2,687,222 | 8/1954 | Wahler | 214—16.1 |
| 3,034,659 | 5/1962 | Willison et al. | 214—15 XR |
| 3,124,209 | 3/1964 | Flipse | 214—15 XR |
| 3,175,722 | 3/1965 | Paulssen | 214—731 |

GERALD M. FORLENZA, Primary Examiner

RAYMOND B. JOHNSON, Assistant Examiner

U.S. Cl. X.R.

212—128